US007911498B2

(12) United States Patent
Shen

(10) Patent No.: US 7,911,498 B2
(45) Date of Patent: Mar. 22, 2011

(54) COMPENSATION DEVICE FOR NON-UNIFORM REGIONS IN FLAT PANEL DISPLAY AND METHOD THEREOF

(75) Inventor: Yu-Chuan Shen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1109 days.

(21) Appl. No.: 11/557,961

(22) Filed: Nov. 8, 2006

(65) Prior Publication Data

US 2007/0132895 A1 Jun. 14, 2007

(30) Foreign Application Priority Data

Dec. 12, 2005 (TW) ............................... 94143840 A
Aug. 29, 2006 (TW) ............................... 95131697 A
Aug. 29, 2006 (TW) ............................... 95131707 A

(51) Int. Cl.
*H04N 17/02* (2006.01)

(52) U.S. Cl. ........ 348/189; 348/177; 348/178; 348/179; 348/180; 348/181

(58) Field of Classification Search .................... 345/55, 345/76, 82, 84, 87, 102; 348/177, 178, 179, 348/180, 181, 189
See application file for complete search history.

(56) References Cited

U.S. PATENT DOCUMENTS 5,526,051 A * 6/1996 Gove et al. ............... 375/240.01
6,570,611 B1 * 5/2003 Satou et al. .................. 348/189
6,704,008 B2 * 3/2004 Naito et al. .................. 345/207
2004/0179028 A1 9/2004 Arai
2005/0007364 A1 1/2005 Oyama et al.
2007/0091041 A1 * 4/2007 Chung et al. .................... 345/88
2008/0036703 A1 * 2/2008 Wang et al. ..................... 345/76

OTHER PUBLICATIONS

NEC LCD2180WG-LED, Technical Background and Feature Overview by NEC Display Solutions.

* cited by examiner

*Primary Examiner* — My-Chau T Tran
(74) *Attorney, Agent, or Firm* — Jianq Chyun IP Office

(57) ABSTRACT

Disclosed is a digital signal processing architecture for a flat panel display having non-uniform regions, which is not by means of materials, optical films or fabrication processes. Therefore, the manufacturing cost and complexity of the flat panel display are not negatively affected. In the digital signal processing architecture, a test is performed on the panel for identifying all pixel locations in non-uniform regions and non-uniform types. Then, input video signals are compared with data about the relative non-uniform regions for determining whether the video signal falls in a normal-region pixel or a non-uniform region pixel. Then the non-uniform compensation on the video signal falling in the non-uniform region pixel is based on the non-uniform type, so that the video signals displayed on the panel are not negatively affected.

14 Claims, 9 Drawing Sheets

COMPENSATION DEVICE FOR NON-UNIFORM REGIONS IN FLAT PANEL DISPLAY AND METHOD THEREOF

CROSS-REFERENCE TO RELATED APPLICATION

This application claims the priority benefit of Taiwan applications: serial no. 94143840, filed Dec. 12, 2005, serial no. 95131707, filed Aug. 29, 2006 and serial no. 95131697, filed Aug. 29, 2006. All disclosures of the Taiwan applications are incorporated herein by reference.

BACKGROUND OF THE INVENTION

1. Field of Invention

The present invention relates to a compensation device for non-uniform regions in a flat panel display and a method thereof. More particularly, the present invention relates to a compensation device for non-uniform regions in a flat panel display through digital signal processing and a method thereof.

2. Description of Related Art

Various flat panel displays are developed directing to eliminate the disadvantages of conventional CRT displays, such as heaviness and bulkiness. The flat panel displays can be classified into CRT displays, liquid crystal displays (LCDs), plasma displays, organic light emitting diode (OLED) displays and so on. Each of the above flat panel displays has its own advantages.

For an LCD, the fabricating process of the LCD panel relates to complicated combination and materials such as plates of backlight module, polarizing films, brightness enhancement films, press fit of two glass substrates. If a slight fault happens in one fabrication step of the LCD, observable non-uniform regions will appear when a final light-on test is performed, wherein the fault is the so-called mura phenomenon such as bad pixel or non-uniform gray-scale or color. Moreover, observable non-uniform regions of various degrees may also appear after the light-on test as the light provided by the plates of backlight module is not uniform.

Therefore, the non-uniform regions are generally a phenomenon of poor display caused by, for example, non-uniformity in the plates of backlight module and fabrication processes of the display. The characteristics of the non-uniform regions or mura are, for example, distorted gray scales/colors with uncertain shapes. First, for the distorted gray scales/colors, the common non-uniform regions include, for example, white spots, dark spots, bright regions and dark regions, wherein the white spot and the dark spot represent that some pixel has defects, and the dark region and the bright region represent that the pixels in the region have defects. Next, the appearance of the non-uniform regions can be, for example, lateral stripes, 45° stripes, or straightly cut blocks appearing in one corner or scattering everywhere irregularly.

The non-uniform regions that greatly impact the visual feeling generally attribute to the faults during the fabricating or assembling processes. In order to reduce the non-uniform regions, the manufacturers usually improve the processes to eliminate the mura phenomenon, for example, improving materials, thickness, etching, physical property/chemical property recipes, fabrication processes, etc. in de-mura, mura-free fields. Additionally, as an LCD panel is formed by a combination of two glass substrates, the faults occurred in the combination of the glass substrates may also lead to non-uniform regions. Moreover, in another aspect, the faults in the designing, manufacturing and assembling of the backlight module plate of the LCD may also result in the non-uniform regions.

Therefore, directing to the causes of the non-uniform regions, the occurrence thereof can be reduced by improving the fabrication processes. Moreover, the causes of the non-uniform regions can be detected/classified by setting up several automatic monitoring stations during the processes for improvement. However, the aforementioned improving manner also has disadvantages. For example, the improvement of processes has to change the process parameters, such that the fabrication processes of a panel become more complicated. Additionally, the set-up of the monitoring stations also results in a significant increase in the manufacturing cost of the panel. U.S. Patent Publication No. 20040179028 discloses a process compensation method, which increases the cost in the fabrication process or panel design. Moreover, U.S. Patent Publication No. 20050007364 discloses a process inspection method, which significantly increases the complexity of the fabrication process.

Accordingly, in the de-mura or mura-free fields, a technology for processing non-uniform regions in a panel through signal processing must be provided. Through the technology, the fabrication processes are not changed, and the non-uniform regions in the panels are processed appropriately.

SUMMARY OF THE INVENTION

The present invention is directed to providing a compensation device for non-uniform regions in a flat panel display through digital processing and a method thereof, so as to eliminate non-uniform regions in the panel by a correction/compensation processing method.

The present invention is further directed to providing a compensation device for non-uniform regions in a flat panel display through digital processing and a method thereof, which is applicable to LCDs, plasma displays, OLED displays, rear-projection displays etc., and also applicable to LED plates of backlight module to control direct compensation.

The present invention is still directed to providing a compensation device for non-uniform regions in a flat panel display through digital processing and a method thereof, which will not increase the manufacturing cost of the flat panel display as the non-uniform regions are not processed by means of materials, optical films or fabrication processes.

According to the above or other objectives, the present invention provides a compensation device for non-uniform regions in a flat panel display, so as to eliminate the negative impact of the non-uniform regions in a panel on the display of a video signal. The compensation device for non-uniform regions comprises a digital non-uniform-region processing circuit, which further comprises a non-uniform-region compensation unit. According to a test result of the non-uniform regions in the panel, the non-uniform-region compensation unit in the digital processing circuit properly compensates the video signal through digital processing. Thus, the video signal is processed based on the test result, such that the non-uniform regions will not negatively affect the video signal displayed on the panel. The processing architecture for non-uniform regions is achieved by digital compensation, instead of by materials, optical films or fabrication processes.

According to a compensation method for non-uniform regions disclosed in a preferred embodiment, the digital compensation can be performed by a mathematical operation unit, logic operation unit, direct mapping unit, dynamic operation unit or a combination thereof.

According to the above or other objectives, the present invention provides a compensation method for non-uniform regions, which is suitable to process a panel with non-uniform regions. The method comprises: determining whether a video signal falls in a normal-region pixel or a non-uniform region pixel according to a test result of the panel; when the video signal is determined to be falling in the non-uniform region pixel, compensating the video signal through digital processing according to the non-uniform region type of the non-uniform region pixel. The video signal is compensated by digital compensation, instead of by materials, optical films or fabrication processes and so on. As such, the non-uniform regions in the panel are corrected without increasing the process complexity and manufacturing cost of the panel.

According to a compensation method for non-uniform regions disclosed in a preferred embodiment, the digital compensation can be performed by a mathematical operation step, logic operation step, direct mapping step, dynamic operation step or a combination thereof.

In order to make the aforementioned and other objectives, features and advantages of the present invention comprehensible, preferred embodiments accompanied with figures are described in detail below.

DESCRIPTION OF EMBODIMENTS

The present invention resolves the problem of non-uniform regions in a panel through digital compensation. Seen from the following embodiments, video signals to be displayed in non-uniform regions are compensated by means of digital compensation such as mathematical operation, logic operation, direct mapping, dynamic operation or a combination thereof. Even though new types of non-uniform regions may appear in the future, these new non-uniform regions can still be processed by updating the aforementioned processes or by adding other digital compensation processes. In the de-mura or mura-free fields, the present invention provides digital compensation to process a defective panel, wherein the defective panel can be an LCD panel or an LED backlight module plate, so as to improve the quality and reduce the cost.

Figure 1:
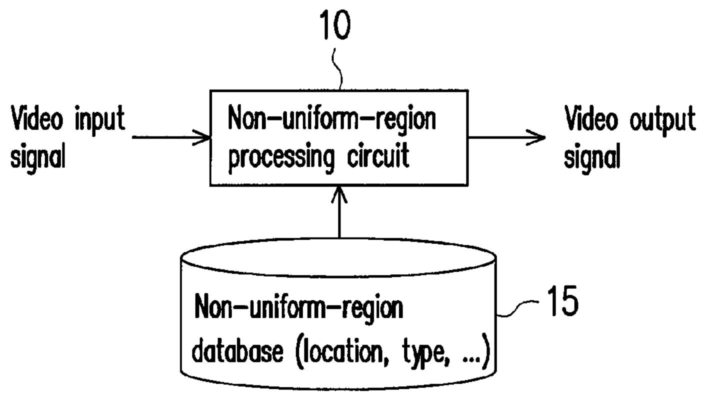
FIG. 1 is a functional block diagram according to an embodiment of the present invention.

Referring to FIG. 1, it is a functional block diagram of processing the non-uniform regions according to an embodiment of the present invention. A database 15 for non-uniform regions is created in advance directing to the panel of an embodiment of the present invention. That is, after a light-on test is performed on the panel, the location information/type information/variation amount information and other associated information of the non-uniform regions in the panel are identified and then stored in the database 15 for non-uniform regions. It is known, the pixel is the minimum display unit for a panel. In the following description, the pixel falling in a non-uniform region is referred to as a non-uniform region pixel, and the pixel falling in a normal region is referred to as a normal-region pixel. Therefore, the location information of the database 15 includes the locations of all non-uniform region pixels. Additionally, as described above, the non-uniform regions at least can be classified into white spots, dark spots, bright regions, dark regions and so on. As the compensation method for each type of non-uniform regions is not identical, the type information should be acquired in addition to the location information when a non-uniform region is detected, so as to carry out the optimal compensation depending on the type of each of the non-uniform regions. Furthermore, the database 15 can record the correction/compensation manner of each type of the non-uniform regions, thereby facilitating the process of the processing circuit 10 for non-uniform regions.

After receiving the video input signal, the processing circuit 10 for non-uniform regions determines whether non-uniform region processing (compensation) should be performed on the video input signal and how to perform the non-uniform region processing according to the location information/type information/variation amount information of the non-uniform regions extracted from the database 15. Finally, the processed video signal or the video signal that does not need to be processed is output to a post-circuit (not shown). The video input signal at least includes the location information of the pixel, i.e., the location on which the video is displayed, and the information of gray scales/colors, i.e., the brightness/color of the video.

Figure 2:
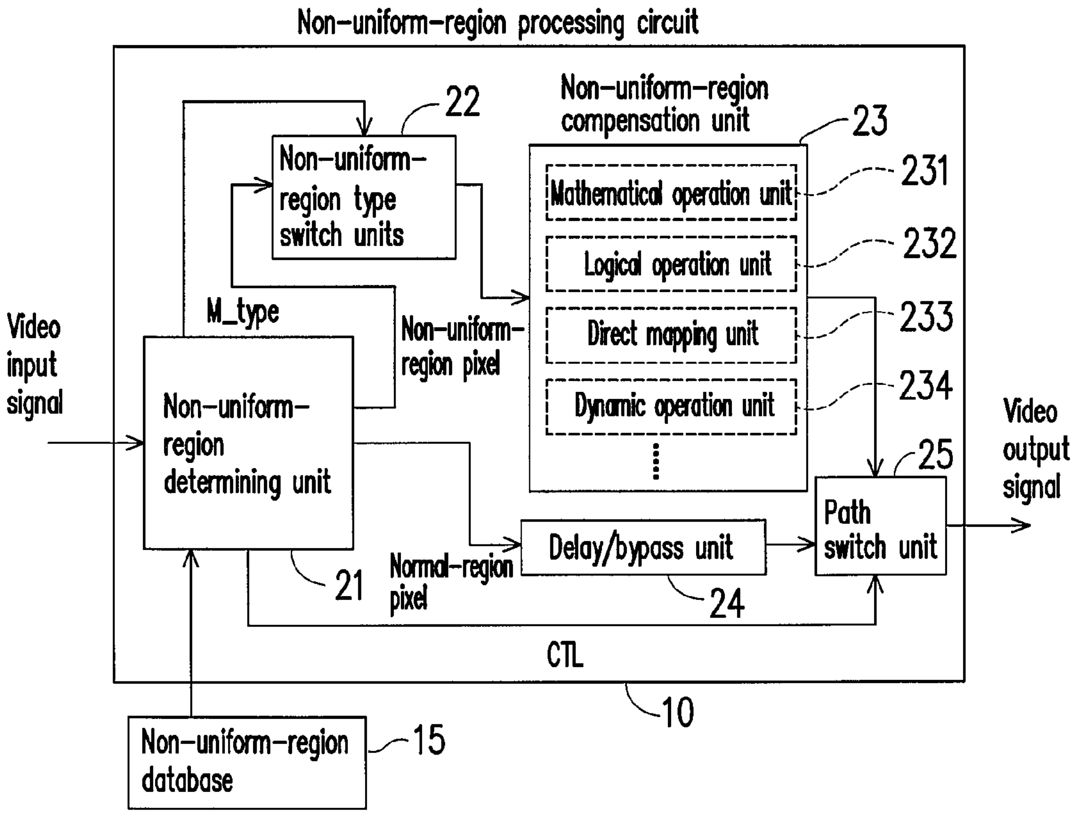
FIG. 2 is a functional block diagram of the processing circuit 10 for non-uniform regions according to an embodiment of the present invention.

FIG. 2 is a functional block diagram of a non-uniform-region processing circuit according to an embodiment of the present invention. As shown in FIG. 2, the processing circuit 10 for non-uniform regions includes a determining unit 21 for non-uniform regions, a type switch unit 22 for non-uniform regions, a compensation unit 23 for non-uniform regions, a delay/bypass unit 24 and a path switch unit 25.

The determining unit 21 for non-uniform regions determines whether the received video input signal falls in a normal-region pixel or a non-uniform region pixel according to the location information of the non-uniform regions delivered from the database 15 for non-uniform regions. That is, the determining unit 21 for non-uniform regions compares the location information of the pixel of the video input signal with the location information of the non-uniform regions in the database 15. If the two pieces of information are consistent, the video input signal is determined to be falling in a non-uniform region pixel, otherwise in a normal-region pixel.

Afterward, the determining unit 21 for non-uniform regions transmits the video input signal determined to be falling in a non-uniform region pixel and the type information M_type delivered from the database 15 to the type switch unit 22 for non-uniform regions.

According to the type information M_type, the type switch unit 22 for non-uniform regions transmits/switches the video input signal determined to be falling in a non-uniform region pixel to an appropriate operation unit within the compensation unit 23 for non-uniform regions.

The compensation unit 23 for non-uniform regions may include a mathematical operation unit 231, a logic operation unit 232, a direct mapping unit 233 and a dynamic operation unit 234. The mathematical operation unit 231 carries out a mathematical operation on (the gray scale/color information of) the video input signal delivered from the type switch unit 22 for non-uniform regions, such as addition/subtraction, multiplication/division and biased-offset. The logic operation unit 232 carries out a logic operation on (the gray scale/color information of) the video input information, such as logic "AND", logic "OR" and logic "XOR". The direct mapping unit 233 performs a mapping on (the gray scale/color information of) the video input signal, such as a look-up table (LUT) method. For example, when a bright region appears on the panel, the gray scale/color signal of the non-uniform region pixel can be adjusted and reduced via the LUT method, thereby achieving the effect of compensating the non-uniform regions. The dynamic operation unit 234 allocates different weighting values to the video input signals based on location or gray scale, so as to perform compensation. In the present invention, the digital compensation can be performed by the mathematical operation unit 231, the logic operation unit 232, the direct mapping unit 233, the dynamic operation unit 234 or a combination thereof. Moreover, in the compensation unit 23 for non-uniform regions, other digital operation units can be adopted on demands to treat the non-uniform regions in different types of or new digital processing units, such that the embodiment of the present invention has extensibility.

Seen from an embodiment of the present invention, the present invention can reduce defective panels, process the non-uniform regions and provide an advanced digital compensation technique in the de-mura and mura-free fields.

Under a specific circumstance, a certain video input signal can be input to two or more units 231-234 simultaneously for performing a more appropriate compensation. The compensation unit 23 for non-uniform regions inputs the compensated video signal to the path switch unit 25. The path switch unit 25 is used to make sure that the sequence of the video signals output from the processing circuit 10 for non-uniform regions is correct. That is because, when a plurality of video input signals is continuously and sequentially input to the processing circuit 10 for non-uniform regions, the video signals after being processed also have to be output from the processing circuit 10 for non-uniform regions according to the original sequence for fear of generating a distorted video frame.

If the determining unit 21 for non-uniform regions determines that the video signal falls in a normal-region pixel, the video input signal (falling in the normal-region pixel) may be input to the delay/bypass unit 24. The delay/bypass unit 24 includes a register for registering the video signal falling in the normal-region pixel, if necessary. The reason why the video signal falling in the normal-region pixel should be registered is as follows. Provided that a certain (or some) video signal(s) is determined to be falling in a non-uniform region pixel, the non-uniform-region compensation unit takes some time to process the video signal, and meanwhile, a subsequent video signal is input to the processing circuit 10.

If the subsequent video signal is determined to be falling in a normal-region pixel, the video signal must be registered (delayed) in the delay/bypass unit 24, and cannot be output until the video signal originally falling in the non-uniform region pixel has been compensated, delivered to the path switch unit 25 and then been output. Under some circumstances, the video signal falling in the normal-region pixel can be passed to the path switch unit 25 without being registered/delayed.

The path switch unit 25 is controlled by a control signal CTL output by the determining unit 21 for non-uniform regions. The control signal CTL at least designates normal or mura for controlling the sequence of the continuously input video signals. According to the control signal CTL, the path switch unit 25 determines whether to output the corrected/compensated video signal output by the compensation unit 23 for non-uniform regions as a video output signal, or to output the uncompensated video signal by the delay/bypass unit 24.

Figure 3:
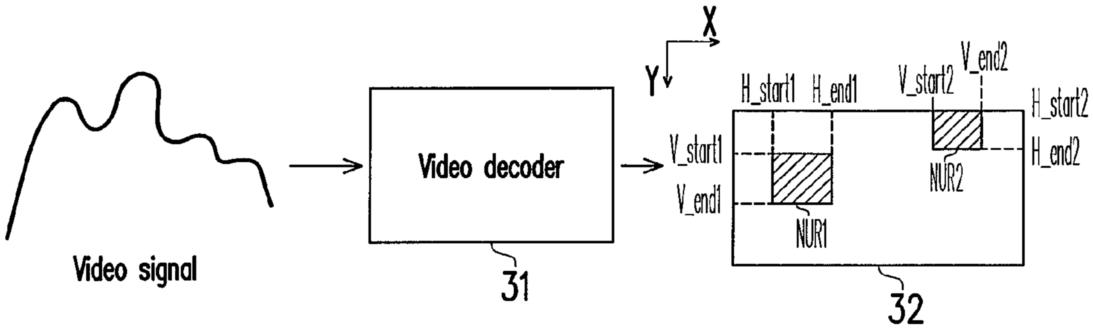
FIG. 3 is an operation chart of decompressing a video signal with a video decoder 31 according to an embodiment of the present invention.

The following few embodiments are used to explicitly illustrate the operating principle of the processing circuit 23 for non-uniform regions. Referring to FIG. 3, it is an operation chart of decompressing a video signal with a video decoder 31 according to an embodiment of the present invention. Referring to FIGS. 3 and 2 together, the video signal is input into the video decoder 31. The video decoder decodes the video signal into a video input signal containing location information, and the determining unit 21 for non-uniform regions is used to determine whether a portion of the video input signal falls in a non-uniform region. As for the panel 32 in FIG. 3, a non-uniform region NUR1 is defined by the boundaries of H_start1, H_end1, V_start1, V_end1, and a non-uniform region NUR2 is defined by the boundaries of H_start2, H_end2, V_start2, V_end2. If a portion of the video input signal is determined to be falling in the non-uniform region NUR1 or NUR2, digital processing will be performed on the video signal.

An algorithm used by the determining unit 21 for non-uniform regions is as follows:

IF x∊given[H_start1,H_end1] AND y∊given[V_start1, V_end1],

THEN pixel_(x,y) ∊NUR1; or IF (x,y) ∊ given BitMAP/Contour/Boundary of NUR1,

THEN pixel_(x,y) ∊NUR1; Similarly for NUR2

The first line of the algorithm represents that the horizontal coordinate x falls in a region defined by H_start1 and H_end1, the second line represents that the longitudinal coordinate y falls in a region defined by V_start1 and V_end1, and thus the third line determines that the video input signal falls in the non-uniform region NUR1. Or, by another determining mode, the video input signal is determined according to the BitMAP, Contour, Boundary of the non-uniform region NUR1. The BitMAP is a non-uniform region containing the boundaries and the interior. The contour is a non-uniform contour only containing the boundaries. After determining the type of a non-uniform block, the determining unit 21 for non-uniform regions performs subsequent compensation directing to the characteristics of the block. The last line represents that determination is also performed on the non-uniform region NUR2 in the same way.

Another algorithm used by the determining unit 21 for non-uniform regions is as follows:

IF pixel_(x,y) ∊NUR1, THEN NUR_TYPE=TYPE1;

e.g., TYPE1 means white-spot, dark-spot . . .

similar for TYPE2

The first line of the algorithm represents that if the pixel at the location (x, y) belongs to the non-uniform region NUR1, the parameter NUR_TYPE of the non-uniform region is set as TYPE1 for recording types, such as white-spot and dark-spot, thus determining whether the video input signal falls in a non-uniform region of white spot or dark spot. Other TYPEs are similar.

Referring to FIG. 2, the mathematical operation unit 231 is used to perform compensation, and an algorithm using mathematical operation to compensate is as follows:

$$\begin{aligned}[RGB] &= MATHFun([RGB], [dR, dG, dB]) \\ &= [RGB] + [\, dR \quad dG \quad dB \,];\ \text{or} \\ &= [RGB] - [\, dR \quad dG \quad dB \,];\ \text{or} \\ &= [RGB] + gain * [\, dR \quad dG \quad dB \,];\ \text{or} \\ &= [RGB] - gain * [\, dR \quad dG \quad dB \,] + \text{offset};\end{aligned}$$

The first line of the algorithm sets the video output signal [RGB] as a mathematical formula (video input signal [RGB], compensation value [dR,dG,dB]), which performs the compensation mode from the second line to the fifth line based on each non-uniform region. The second to fifth lines represent adding various compensation values [dR,dG,dB] to the video output signal [RGB]. For example, the compensation value [dR,dG,dB] without gains is added to the video input signal [RGB] in the second line for performing compensation. The compensation value [dR,dG,dB] without gains is subtracted from the video input signal [RGB] in the third line for performing compensation. The fourth line adopts gains to adjust the compensation value [dR,dG,dB] and adds the video input signal [RGB]. Moreover, in the fifth line, besides adopting gains to adjust the compensation value [dR,dG,dB] and adding the video input signal [RGB], an offset value is further added. Those skilled in the art should understand that the compensation method of the mathematical operation unit 231 is not limited to the above algorithm, but can be adjusted by other mathematical operation formulas designed according to various non-uniform regions.

The logic operation unit 232 is used to perform compensation, and an algorithm using logic operation to compensate is as follows:

$$\begin{aligned}[RGB] &= \text{Log}Fun(RGB], [\, dR \quad dG \quad dB \,] \\ &= [RGB]\text{AND}[\, dR \quad dG \quad dB \,];\ \text{or} \\ &= [RGB]\text{OR}[\, dR \quad dG \quad dB \,];\ \text{or} \\ &= [RGB]XOR[\, dR \quad dG \quad dB \,]; \ldots\end{aligned}$$

The first line of the algorithm sets the video output signal [RGB] as a logic formula (video input signal [RGB], compensation value [dR,dG,dB]), which performs the compensation mode from the second line to the fourth line based on each non-uniform region. The second to fourth lines represent adding various compensation values [dR,dG,dB] to the video output signal [RGB]. For example, the video input signal [RGB] in the second line uses logic symbol "AND" to control the compensation value [dR,dG,dB] to perform compensation, the video input signal [RGB] in the third line uses logic symbol "OR" to control the compensation value [dR,dG,dB] to perform compensation, and the video input signal [RGB] in the fourth line uses logic symbol "XOR" to control the compensation value [dR,dG,dB] to perform compensation. Those skilled in the art should understand that the compensation method of the logic operation unit 232 is not limited to the above algorithm, but can be adjusted by other logic operation formulas designed according to various non-uniform regions.

The direct mapping unit 233 is used to perform compensation, and an algorithm using direct mapping operation to compensate is as follows:

$$\begin{aligned}[RGB] &= MapFun([RGB], [\, dR \quad dG \quad dB \,]) \\ &= \text{curves decided by } LUT\end{aligned}$$

Figure 4:
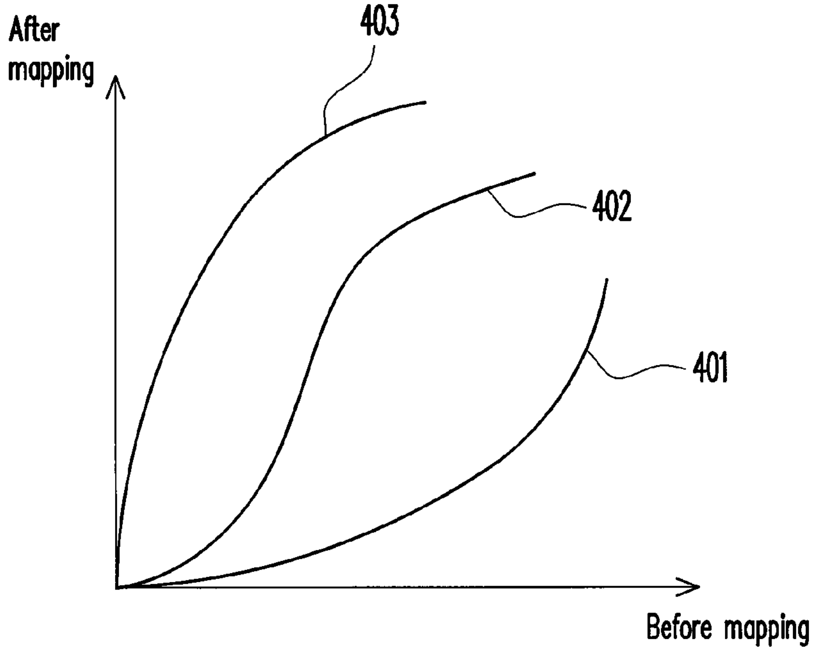
FIG. 4 is a mapping relation graph of the algorithm.

Referring to FIG. 4, it is a mapping relation graph of the above algorithm. The horizontal axis represents the pixel brightness before mapping, and the longitudinal axis represents the pixel brightness after mapping. The first line of the algorithm sets the video output signal [RGB] as a mapping equation (video input signal [RGB], compensation value [dR, dG,dB]), and the compensation is performed respectively by mapping curves 401, 402, 403. The mapping curves 401, 402, 403 are determined by an LUT, wherein dR maps R, dG maps G, dB maps B, or different color gamuts map one another, such as dR mapping G, dG mapping B, dB mapping R. Those skilled in the art should understand that the compensation method of the direct mapping unit 233 is not limited to the above mapping curves, but can be adjusted by other mapping curves designed according to various non-uniform regions.

Seen from the embodiments of the present invention, a defective panel in the present invention can be compensated by gains, offset, LUT, and logic operation, instead of by materials, optical films or fabrication processes and so on.

Figure 5A:
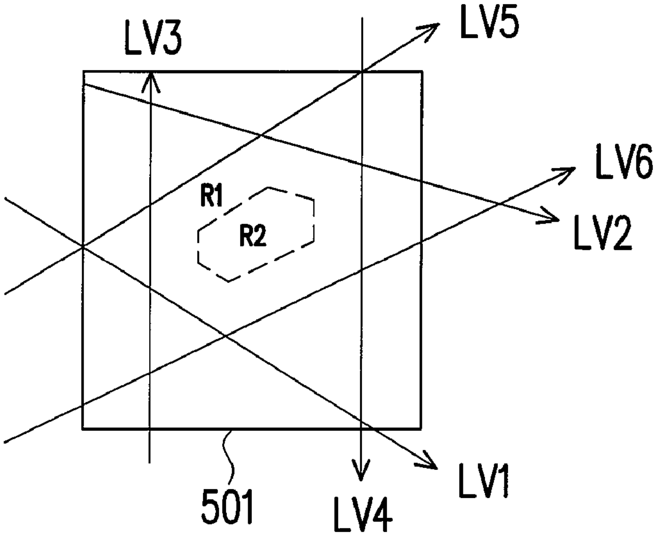
FIG. 5A is a region partition view of the non-uniform regions according to an embodiment of the present invention.
Figure 5B:
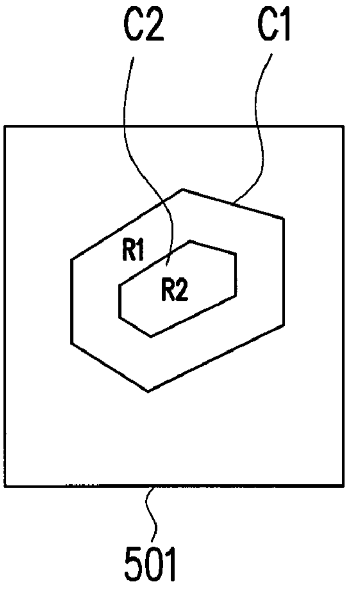
FIG. 5B is a distribution view of the non-uniform regions according to an embodiment of the present invention.

As for the dynamic operation unit 234, the difference between the dynamic operation unit 234 and the aforementioned mathematical operation unit 231, logic operation unit 232, direct mapping unit 233 is that, the dynamic operation unit performs compensation in a progressive way and uses location or gray scale brightness to adjust the weighting values for compensation. FIG. 5A is a region partition view of the non-uniform regions according to an embodiment of the present invention. Straight lines LV1-LV6 with different slopes mark out the non-uniform regions. FIG. 5B is a distribution diagram of the non-uniform regions according to an embodiment of the present invention. Referring to FIGS. 5A and 5B together, an external contour C1 contains a region R1 and an internal contour C2, the internal contour C2 contains a region R2, and the region R1 is disposed between the external contour C1 and the internal contour C2.

An algorithm adopting location dynamic operation to perform compensation is as follows:

$$[R'G'B'] = \text{SpaceFadingFun}([RGB], [dRdGdB], \text{SpaceWeighting}(\bullet))$$

e.g., $$[R'G'B'\_]A = [RGB]\_A + [DRdGdB]\_A * \text{SpaceFadingWeighting}(R\_A);$$

e.g., $$[Y'U'V']\_A = [YUV]\_A + [dYdUdV]\_A * \text{SpaceFadingWeighting}(R\_A);$$

Where R_A: distance of A point to NUR central point similarly, for YUV, YCbCr . . . .

Figure 6A:
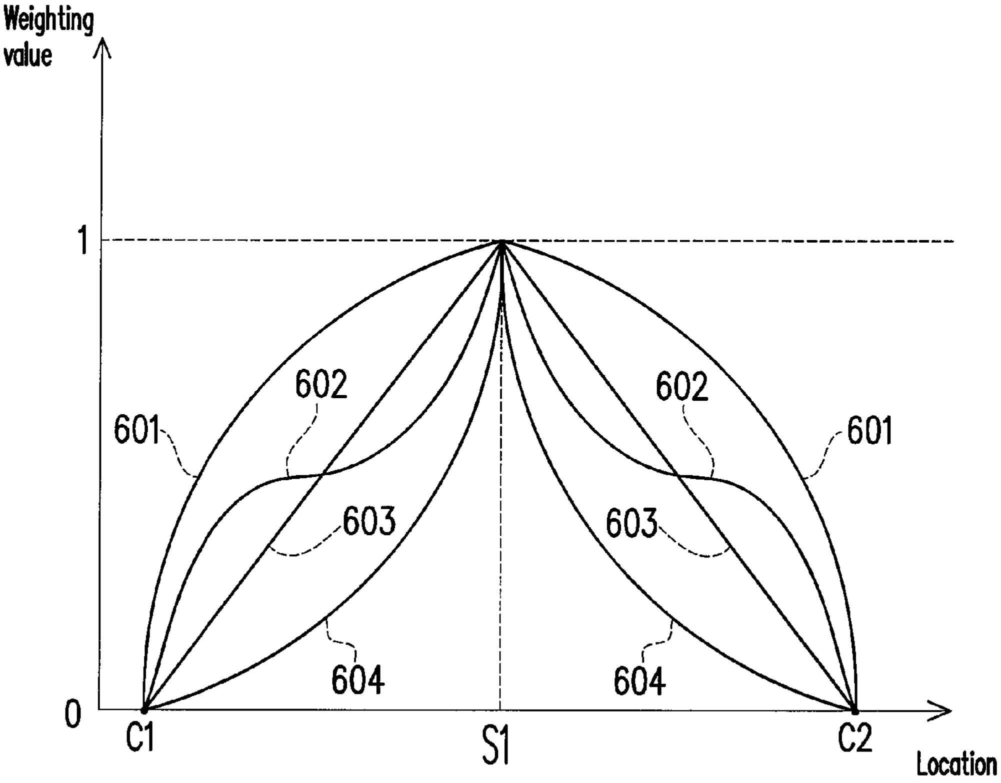
FIG. 6A is a curve diagram of dynamic operation according to an embodiment of the present invention.
Figure 6B:
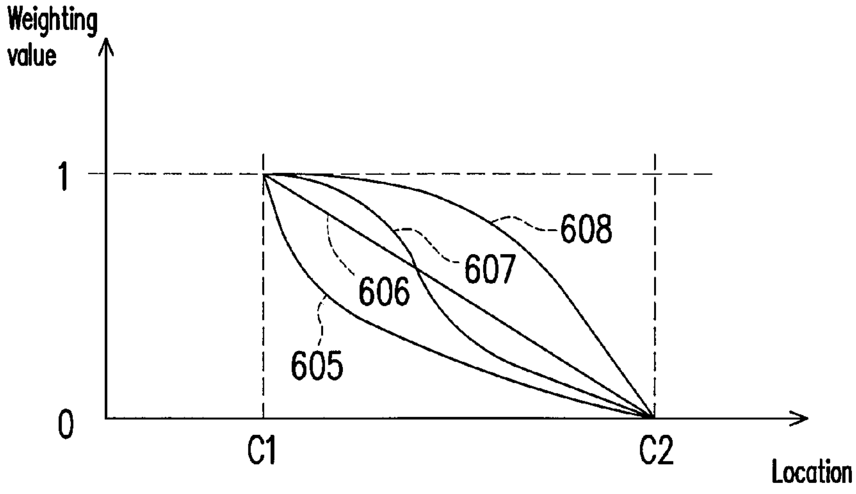
FIG. 6B is another curve diagram of dynamic operation according to the embodiment of the present invention.
Figure 6C:
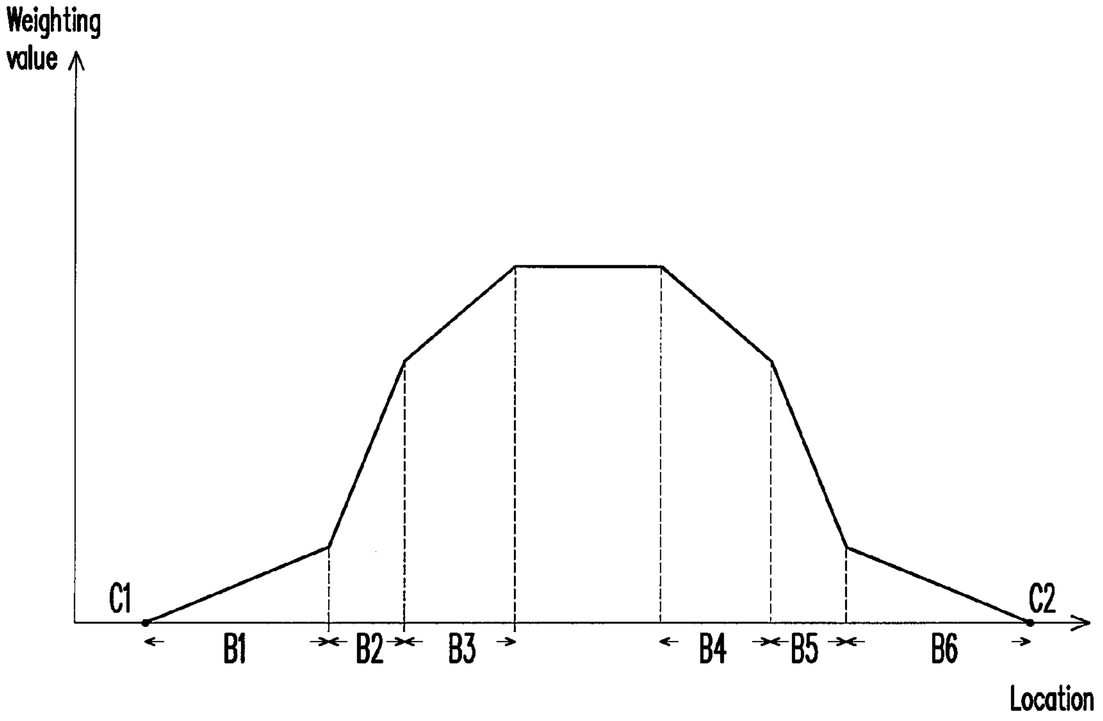
FIG. 6C is a curve diagram of dynamic operation according to another embodiment of the present invention.

The first line of the algorithm sets the video output signal [R'G'B'] as a location dynamic operation equation (video input signal [RGB], compensation value [dR dG dB]*location fading weighting value (•)), which performs the dynamic operation of the algorithm according to the Contour and Boundary of the non-uniform region NUR. A video output signal [R'G'B']_A is set as a video input signal [RGB]_A plus the compensation value [dR dG dB]_A multiplied by the location fading weighting value (SpaceFadingWeighting (R_A)). Similarly, a video output signal [Y'U'V']_A is set as a video input signal [YUV]A plus compensation value [dY dU dV]_A multiplied by the location fading weighting value (SpaceFadingWeighting(R_A)), wherein R_A represents the distance from the compensation point to the center of the non-uniform region. Referring to the algorithm, FIGS. 5B and 6A together, FIG. 6A is a curve diagram of dynamic operation according to an embodiment of the present invention. The horizontal axis represents location, the longitudinal axis represents weighting value, and different weighting values of various pixels are adjusted by curves 601-604 according to locations between the internal contour C1 and the external contour C2. For example, the center point S1 has a weighting value of 1, and in such a progressive way, a more natural visual compensation effect can be achieved by the curves 601-604. Those skilled in the art should understand that the compensation method of the dynamic operation unit 234 is not limited to the above dynamic operation curves, but can be adjusted by other location dynamic operation curves designed according to various non-uniform regions. FIG. 6B is another curve diagram of dynamic operation according to the embodiment of the present invention. The horizontal axis represents location, the longitudinal axis represents weighting value, and different weighting values of various pixels are adjusted by curves 605-608 according to locations between the internal contour C1 and the external contour C2. Further, referring to FIG. 6C, it is a curve diagram of dynamic operation according to another embodiment of the present invention, wherein the horizontal axis represents location and the longitudinal axis represents weighting value. The difference between FIG. 6C and FIG. 6A is that, in FIG. 6C, six sections B1-B6 are disposed between the internal contour C1 and the external contour C2 for performing compensation, wherein the width of each section, i.e., the spatial delay/shift, is $2^n$.

The weighting value of an embodiment of the present invention is gradually reduced from the center point to the periphery. Meanwhile, those skilled in the art should understand that the weighting value of the present invention is not limited to be gradually reduced from a normal region to a non-uniform region, but can be gradually increased from a normal region to a non-uniform region. In addition, the compensation can be performed from a single side or from double sides.

Figure 7:
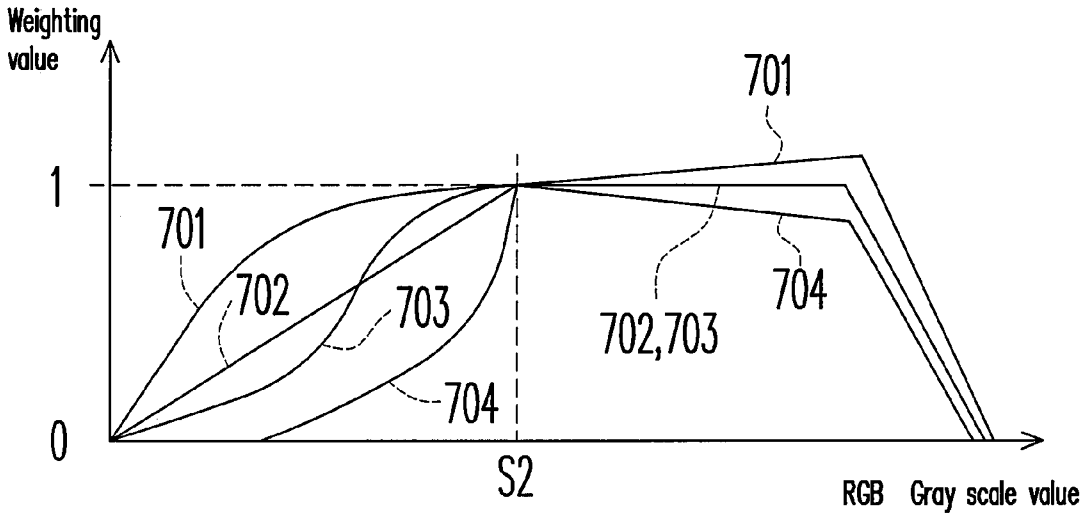
FIG. 7 is a curve diagram of dynamic operation according to still another embodiment of the present invention.

Another algorithm adopting gray scale dynamic operation to perform compensation is as follows:

[*RGB*]=GrayFadingFun([*RGB*][*dRdGdB*],GrayWeighting(•));

e.g.,

[*R'G'B'*]_*A*=[*RGB*]_*A*+[*dRdGdB*]_*A**GrayWeighting([*RGB*]_*A*);

e.g.,

[*Y'U'V'*]_*A*=[*YUV*]_*A*+[*dYdUdV*]_*A**GrayWeighting([*YUV*]_*A*);

Where GrayWeighting([RGB]):weighting depends on [RGB] grays; Similarly, for YUV,YCbCr The first line of the algorithm sets the video output signal [R G'B'] as a gray scale dynamic operation equation (video input signal [RGB], compensation value [dR dG dB]*gray scale weighting value (•)), which performs the dynamic operation of the algorithm according to the gray scale value of the video input signal [RGB]. A video output signal [R'G'B']_A is set as a video input signal [RGB]_A plus the compensation value [dR dG dB]_A multiplied by the gray scale weighting value (GrayWeighting(R_A)). A video output signal [Y'U'V']_A is set as a video input signal [YUV]_A plus the compensation value [dY dU dV]_A multiplied by the gray scale weighting value (GrayWeighting(R_A)), wherein the gray scale weighting value (GrayWeighting(R_A)) of the RGB signal is determined by the gray scale distribution of the RGB, and it is the same with the signals YUV, YCbCr. Together referring to FIG. 7, it is a curve diagram of dynamic operation according to still another embodiment of the present invention, wherein the horizontal axis represents gray scale value of RGB and the longitudinal axis represents weighting value. In the algorithm, curves 701-704 are used to perform dynamic compensation, and different compensations are carried out at each side of the center point S2. Those skilled in the art should understand that the compensation method of the dynamic operation unit 234 is not limited to the above dynamic operation curves, but can be adjusted by other gray scale dynamic operation curves designed according to various non-uniform regions. Meanwhile, those skilled in the art should understand that the weighting value of the present invention is not limited to scale up according to the gray scale value, but can also scale down according to the gray scale value.

Figure 8:
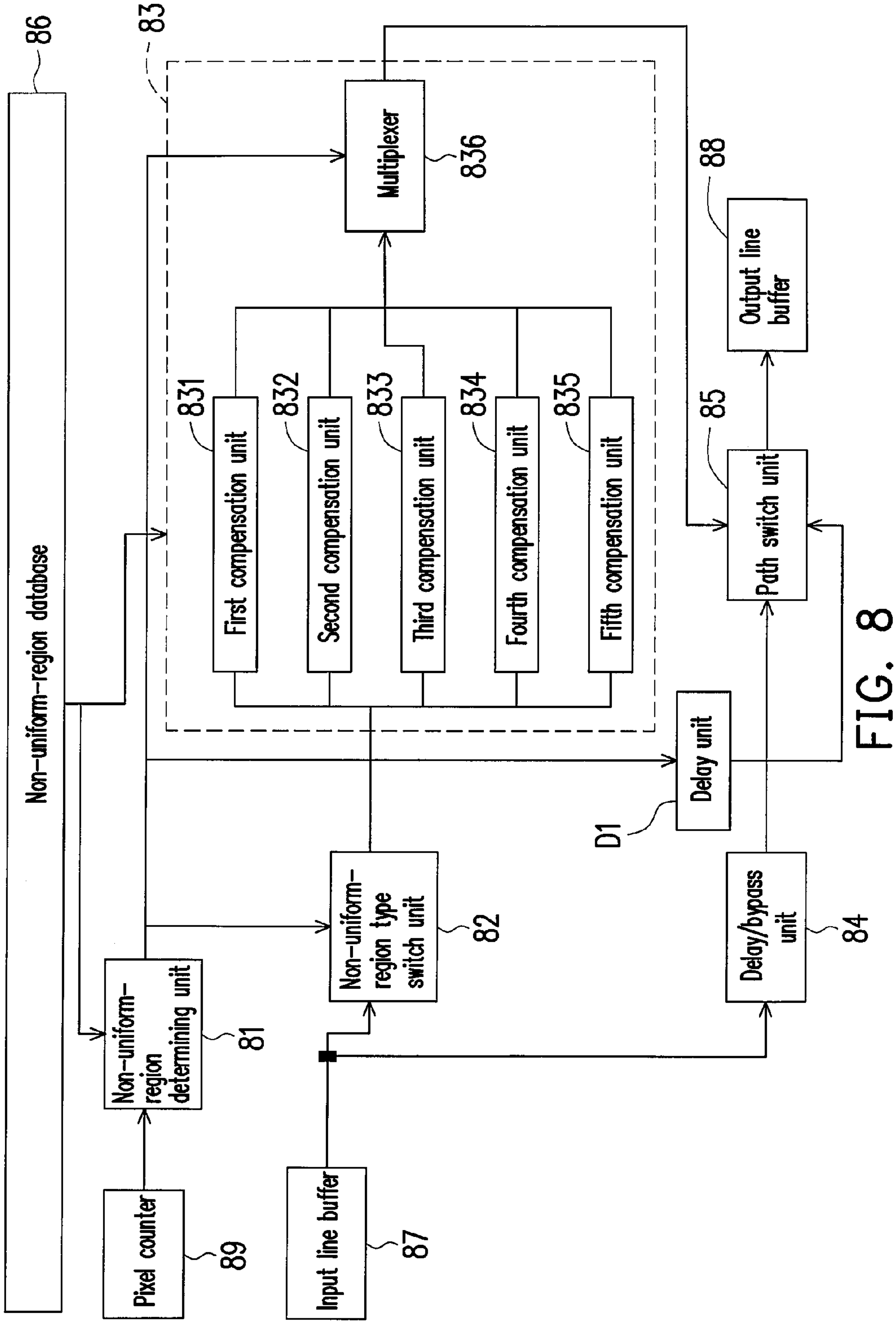
FIG. 8 is a functional block diagram of a compensation device for one-dimensional non-uniform regions according to an embodiment of the present invention.

FIG. 8 is a functional block diagram of a compensation device for one-dimensional non-uniform regions according to an embodiment of the present invention. The compensation device for one-dimensional non-uniform regions includes a determining unit 81 for non-uniform regions, a type switch unit 82 for non-uniform regions, a compensation unit 83 for non-uniform regions, a delay/bypass unit 84, a path switch unit 85, a database 86 for non-uniform regions, an input line buffer 87, an output line buffer 88, a pixel counter 89 and a delay unit D1. The input line buffer 87 receives data and transmits the data to the type switch unit 82 for non-uniform regions and the delay/bypass unit 84. The data of the pixel counter 89 and database 86 for non-uniform regions is delivered into the determining unit 81 for non-uniform regions to receive type determination for non-uniform regions, then input to the type switch unit 82 for non-uniform regions to receive further determination, and afterward input to the compensation unit 83 for non-uniform regions.

The compensation unit 83 for non-uniform regions includes a first compensation unit 831, a second compensation unit 832, a third compensation unit 833, a fourth compensation unit 834, a fifth compensation unit 835 and a multiplexer 836. The compensation units 831-833 only use one method to perform compensation, and the method is selected from among, for example, logic operation, mathematical operation, direct mapping and dynamic operation. The compensation units 834, 835 can use various methods to perform compensation, for example, any combination of logic operation, mathematical operation, direct mapping and dynamic operation. After that, the compensation units 831-835 input the compensated signal to the multiplexer 836, and the data of the multiplexer 836 and the delay/bypass unit 84 are together input to the path switch unit 85, and then output by the output line buffer 88. In addition, the compensation device for one-dimensional non-uniform regions is characterized in having low cost but high complexity.

Figure 9:
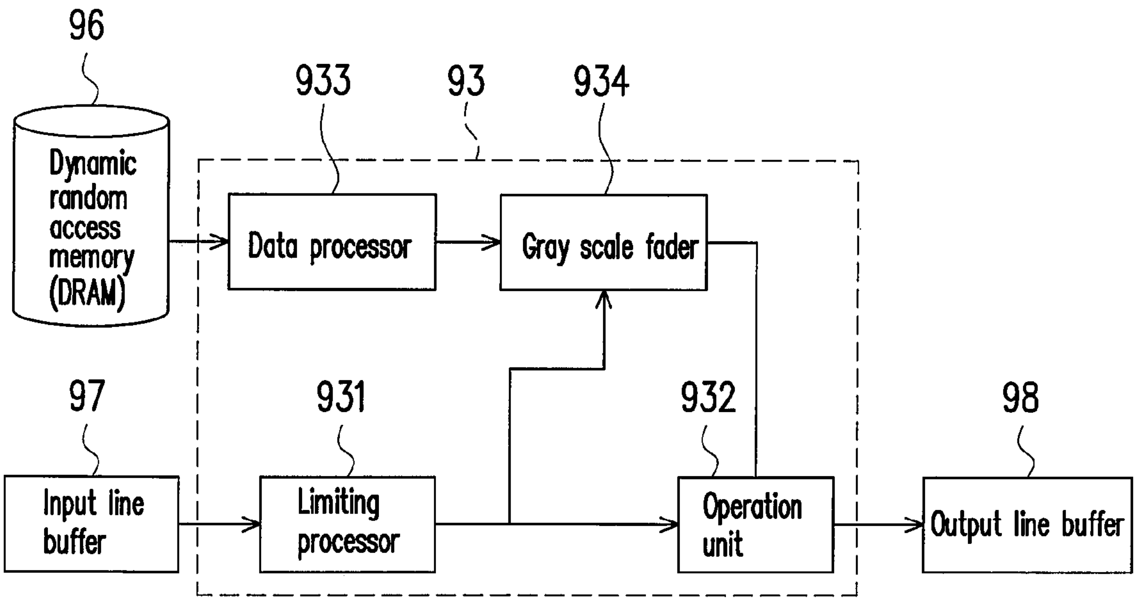
FIG. 9 is a functional block diagram of a compensation device for two-dimensional non-uniform regions according to an embodiment of the present invention.

FIG. 9 is a functional block diagram of a compensation device for two-dimensional non-uniform regions according to an embodiment of the present invention. The compensation device for two-dimensional non-uniform regions includes a processing circuit 93 for non-uniform regions, a dynamic random access memory (DRAM) 96, an input line buffer 97 and an output line buffer 98. The data of the input line buffer 97 is input to the processing circuit 93 for non-uniform regions and then to the output line buffer 98. The processing circuit 93 for non-uniform regions includes a limiting processor 931, an operation unit 932, a data processor 933 and a gray scale fader 934, wherein the limiting processor 931 is used to limit the magnitude of the video signal. The data of non-uniform regions and the information of variation amount are stored beforehand in the DRAM 96 in advance, and the operation unit 932 can perform, for example, logic operation and mathematical operation. The data processor 933 receives the data from the DRAM 96 to perform decoding/decompressing, and then inputs the data to the gray scale fader 934. After that, according to the magnitude of the video signal, the gray scale fader 934 performs gray scale fading of different weighting values on the variation amount information of non-uniform regions stored in the DRAM 96. Afterward, the video signal is input to the operation unit 932. Compared with the compensation device for one-dimensional non-uniform regions, the compensation device for two-dimensional non-uniform regions is characterized in having low complexity but high cost.

To explicitly describe the difference between FIG. 8 and FIG. 9, together referring to the above two figures, the essential members in FIG. 8 are the database 86 for non-uniform regions, the determining unit 81 for non-uniform regions and the compensation unit 83 for non-uniform regions; while the essential members in FIG. 9 are the database 96 for non-uniform regions and the processing circuit 93 for non-uniform regions. The non-uniform-region database in FIG. 8 is used to store one-dimensional data, and the one-dimensional data must be expanded to the two-dimensional space through the determining unit 81. The database 96 for non-uniform regions in FIG. 9 is used to store two-dimensional data, and the two-dimensional data can be directly employed to perform compensation on non-uniform locations in the panel through a point-to-point manner.

Figure 10A:
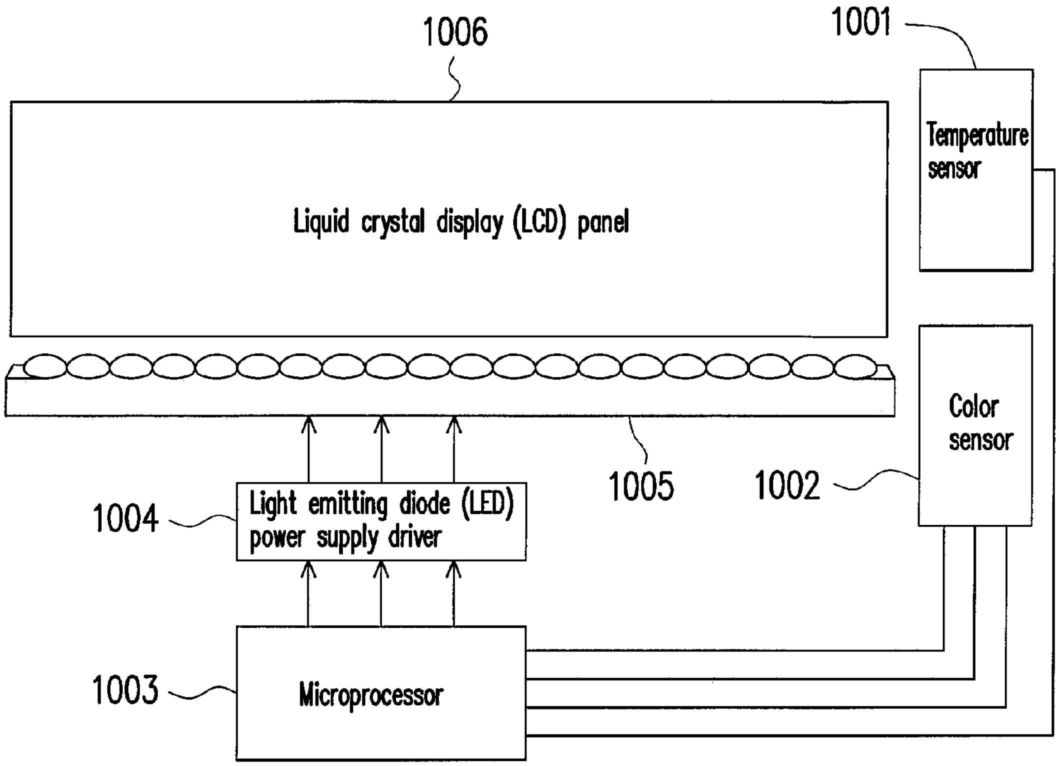
FIG. 10A is a conventional functional block diagram of a display applying an OLED backlight module plate.

FIG. 10A is a functional block diagram of applying an embodiment of the present invention to the display of a conventional OLED backlight module plate. The display includes a temperature sensor 1001, a color sensor 1002, a micro processor 1003, an LED power supply driver 1004, an LED backlight module plate 1005 and an LCD panel 1006. The color sensor 1002 inputs the video signal to the micro processor 1003, and the micro processor 1003 also receives the signal from the temperature sensor 1001 to drive the LED power supple driver 1004. The micro processor 1003 may include a compensation device for non-uniform regions, which is used to store in advance the data of non-uniform regions for the LED backlight module plate 1005, then compensate the video signal and input the video signal to the LED power supply driver 1004. Thus, the LED power supply driver 1004 can be used to drive the LED backlight module plate 1005. Those skilled in the art should understand that the compensation device for non-uniform regions can be disposed in the path of the video signal to compensate the video signal in advance, such that the LED backlight module plate 1005 may emit a light of adjusted brightness or color, thus improving the display quality of the LCD panel 1006.

Figure 10B:
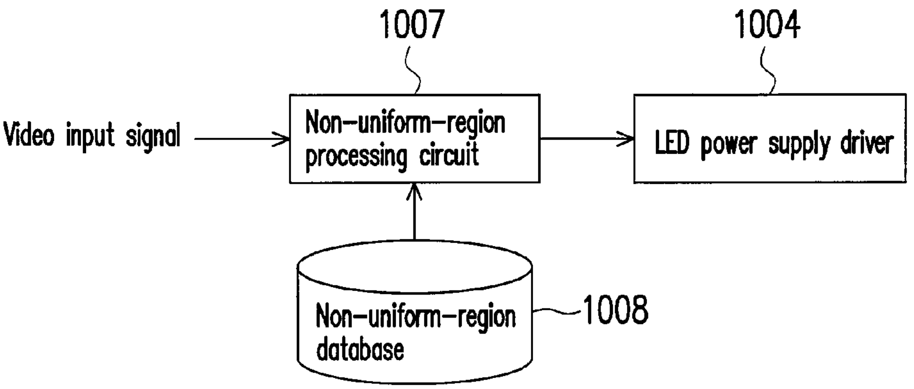
FIG. 10B is a functional block diagram of the compensation device for non-uniform regions according to an embodiment of the present invention applied to the OLED backlight module plate in FIG. 10A.

FIG. 10B is a functional block diagram of the compensation device for non-uniform regions of the present application applied to the conventional OLED backlight module plate in FIG. 10A. The processing circuit 1007 for non-uniform regions and the database 1008 for non-uniform regions constitute a compensation device for non-uniform regions. The video input signal is input to the processing circuit 1007 for non-uniform regions and then to the LED power supply driver 1004, so as to perform compensation. In the above embodiment of the present invention, the non-uniform regions of the LED backlight module plate are not processed by materials, optical films or fabrication processes, so the manufacturing cost and complexity of the LED backlight module plate may not be increased. Moreover, the present invention can be applied to flat panel displays such as CRT displays, LCDs, plasma displays, OLED displays and rear-projection displays, and can provide a digital compensation device and a method thereof in the de-mura or mura-free fields.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A compensation method for non-uniform regions, used in a flat panel display for eliminating the negative impact of non-uniform regions in a panel on display of a video signal, the compensation method comprising:
- according to a test result of the panel, determining whether the video signal falls in a normal-region pixel or a non-uniform region pixel, wherein the test result of the panel comprises a location information of non-uniform regions;
- when the video signal is determined to be falling in the non-uniform region pixel, compensating the video signal through digital processing; and
- using a limiting processor to limit the size of the video signal.

2. The compensation method for non-uniform regions as claimed in claim 1, further comprising using a data processor to process the location information of non-uniform regions.

3. The compensation method for non-uniform regions as claimed in claim 1, further comprising using an input line buffer to receive the video signal.

4. The compensation method for non-uniform regions as claimed in claim 1, further comprising using an output line buffer to output the video signal.

5. The compensation method for non-uniform regions as claimed in claim 1, further comprising using a database to store the location information of non-uniform regions.

6. The compensation method for non-uniform regions as claimed in claim 5, wherein the database is a DRAM.

7. The compensation method for non-uniform regions as claimed in claim 1, further comprising storing a variation amount information of the panel.

8. The compensation method for non-uniform regions as claimed in claim 1, further comprising using a gray scale fader for performing a gray scale fading operation to compensate the video signal.

9. The compensation method for non-uniform regions as claimed in claim 1, wherein the compensation step comprises performing a mathematical operation to compensate the video signal.

10. The compensation method for non-uniform regions as claimed in claim 1, wherein the compensation step comprises performing a logic operation to compensate the video signal.

11. The compensation method for non-uniform regions as claimed in claim 1, wherein the compensation step comprises performing a direct mapping operation to compensate the video signal.

12. The compensation method for non-uniform regions as claimed in claim 1, further comprising compensating the video signal through digital processing, and inputting the video signal to an LED power supply driver to control an LED plate of backlight module.

13. The compensation method for non-uniform regions as claimed in claim 1, wherein the panel is an LCD panel.

14. The compensation method for non-uniform regions as claimed in claim 1, wherein the panel is an LED plate of backlight module.

* * * * *